US010004326B2

(12) United States Patent
Randløv et al.

(10) Patent No.: US 10,004,326 B2
(45) Date of Patent: *Jun. 26, 2018

(54) SUPPORTING FRAME FOR A PIECE OF FURNITURE

(71) Applicant: LINAK A/S, Nordborg (DK)

(72) Inventors: Michael Randløv, Vojens (DK); Casper Jørgensen, Sydals (DK)

(73) Assignee: LINAK A/S, Nordborg (DK)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/312,963

(22) PCT Filed: May 26, 2015

(86) PCT No.: PCT/DK2015/000022
§ 371 (c)(1),
(2) Date: Nov. 21, 2016

(87) PCT Pub. No.: WO2015/180725
PCT Pub. Date: Dec. 3, 2015

(65) Prior Publication Data
US 2017/0238697 A1 Aug. 24, 2017

(30) Foreign Application Priority Data

May 26, 2014 (DK) .................................. 2014 00284
Mar. 20, 2015 (DK) .................................. 2015 00176

(51) Int. Cl.
*A47B 9/00* (2006.01)
*A47B 9/20* (2006.01)
(Continued)

(52) U.S. Cl.
CPC .............. *A47B 9/20* (2013.01); *A47B 13/021* (2013.01); *F16B 12/44* (2013.01); *A47B 2013/022* (2013.01)

(58) Field of Classification Search
CPC ........... A47B 9/00; A47B 9/20; A47B 13/021; A47B 2013/022; F16B 12/44
See application file for complete search history.

(56) References Cited

U.S. PATENT DOCUMENTS 6,595,144 B1 * 7/2003 Doyle ...................... A47B 9/00
108/147
9,730,512 B1 * 8/2017 Bruder ................... A47B 13/02
(Continued)

FOREIGN PATENT DOCUMENTS

DE 202008008239 U1 10/2009
WO 2010036174 A1 4/2010

OTHER PUBLICATIONS

International Search Report and Written Opinion for corresponding Patent Application No. PCT/DK2015/000022 dated Sep. 15, 2015.

*Primary Examiner* — Daniel J Rohrhoff
(74) *Attorney, Agent, or Firm* — Renner, Otto, Boisselle & Sklar, LLP.

(57) ABSTRACT

The invention relates to a supporting frame with a base unit comprising a compartment at least for partial reception of the housing of the lifting column (79) and a cross member (74) for mounting on the base unit (59). The supporting frame comprises a locking element (94), which when placed in-a locked position exerts a squeezing force between the base unit (59), the lifting column housing and the cross member (74), by which the lifting column housing and the cross member (74) are fixed in the base unit (59). The supporting frame further comprises means for retaining the locking element in the locked position. The lifting columns are of the type, which comprises telescopically arranged profiles with an upper and lower end to which upper end a housing is secured.

15 Claims, 11 Drawing Sheets

(51) Int. Cl.
*F16B 12/44* (2006.01)
*A47B 13/02* (2006.01)

(56) References Cited

U.S. PATENT DOCUMENTS

| | | | |
|---|---|---|---|
| 2012/0304900 A1 | 12/2012 | Henriott et al. | |
| 2014/0367538 A1* | 12/2014 | Widholzer | A47B 9/20 248/188.1 |
| 2015/0108297 A1* | 4/2015 | Randlov | A47B 9/04 248/188.4 |
| 2017/0135466 A1* | 5/2017 | Randlov | A47B 9/20 |
| 2017/0238697 A1* | 8/2017 | Randlov | A47B 9/20 |

* cited by examiner

SUPPORTING FRAME FOR A PIECE OF FURNITURE

This application is a national phase of International Application No. PCT/DK2015/000022 filed May 26, 2015 and published in the English language, which claims priority to Denmark Application Nos. PA 2014 00284 filed May 26, 2014 and PA 2015 00176 filed Mar. 20, 2015, which are all hereby incorporated herein by reference in their entirety.

The present invention relates to a supporting frame for a piece of furniture with a lifting column comprising at least one profile having an upper and lower end, said upper end having a housing secured thereto.

Lifting columns comprising a telescopic guide and a box-shaped housing for height-adjustable tables were developed in the late 1990s, where the telescopic guide has the appearance of a table leg. The box-shaped housing, usually rectangular, contains an electric motor, transmission and various electronics. An example of such a lifting column is shown in FIG. 1 of WO 2004/100632 A1 to LINAK A/S. A different type of lifting column is described in WO 03/003876 A1 to LINAK A/S, where the entire drive unit, i.e. electric motor, transmission and various electronics, is integrated in the telescopic guide.

A supporting frame comprising an upper frame, which typically comprises two longitudinal members and two cross members, at least one lifting column and at least one foot. The lifting column can, as described above, be constructed with or without a box-shaped housing at the upper end. The longitudinal members are usually constructed as through-going tubular profiles placed in parallel having a mutual distance between them corresponding to the width of the box-shaped housing. To each end of the longitudinal members a cross member is secured. The longitudinal members and the cross members are usually welded up or should be assembled by means of screws. A lifting column is mounted at each end in that the box-shaped housing is positioned between the longitudinal members with one end up against the respective cross member. The lifting column is secured by means of screws through the two longitudinal members and the cross member into the box-shaped housing. An example of such a table is shown in FIG. 1 of U.S. Pat. No. 6,509,705 B2 to LINAK A/S. The assembly of the supporting frame is relatively troublesome and time-consuming. This is owing to the fact that the parts of the supporting frame are relatively large and heavy. Further, the assembly of the supporting frame requires a number of screw operations, which require that each part is placed correctly relative to each other.

The purpose of the invention is to provide a supporting frame comprising electrically driven lifting columns for an adjustable piece of furniture, which in a simple and non-time-consuming manner can be assembled and secured to the desired piece of furniture.

This is achieved according to the invention by constructing the supporting frame with a base unit having a compartment at least for partial reception of the housing of the lifting column, and a cross member for mounting on the base unit. The supporting frame comprises a locking element, which when placed in a locked position exerts a squeezing force between the base unit, the housing of the lifting column and the cross member, by which the lifting column housing and the cross member are fixed in the base unit. The supporting frame further comprises means for retaining the locking element in the locked position. The lifting columns are of the type comprising telescopically arranged profiles with an upper and lower end, to which upper end a housing is secured. Hereby, a supporting frame is achieved, which is simple and easy to assemble and mount without the use of tools. Thus, the before mentioned screw operations are eliminated.

In an embodiment the cross member has a profile with a C-shaped cross section prepared for engagement with the base unit. In a further embodiment the base unit comprises flaps for engagement with the cross member. Thus, the base unit can be received in the cross member.

In an embodiment the base unit comprises a guide, which depending on the construction of the supporting frame functions as a guide for correct mounting of the lifting column, including fixation of this in the base unit.

In an embodiment the base unit has a U-shaped cross section with two parallel side walls having a mutual distance between them corresponding to the width of the lifting column housing and where the guide for the base unit is placed on the parallel side walls. By having minimum clearance between the side walls of the base unit and the lifting column housing an improved fixation of the housing to the base unit is achieved.

In an embodiment of the supporting frame the guide of the base unit is placed on or constructed in the side walls of the base unit.

In an embodiment the base unit comprises a transverse wall, which connects the two parallel side walls of the base unit, against said transverse wall a rear end of the lifting column housing can rest. The fixation is improved in that yet another surface of the housing is fixed to the base unit.

In an embodiment the transverse wall comprises a tongue, which with an end protrudes into the compartment of the base unit, i.e. the compartment which at least partially receives the housing of the lifting column. In another embodiment the cross member comprises a tongue which, when the cross member is mounted to the base unit, with an end protrudes into the compartment of the base unit, i.e. the compartment which at least partially receives the housing of the lifting column.

In an embodiment the lifting column housing comprises an indentation for engagement with the tongue in the transverse wall or the cross member. By this engagement the fixation between the housing of the lifting column and the base unit is improved in that the lifting column housing is pushed towards the bottom of the base unit when the locking element is brought into its locked position.

In an embodiment the base unit comprises a flap placed such that it is in continuation of the side walls of the base unit. Thus, a direct or indirect interface between the housing of the lifting column and the cross member is ensured. When the locking element is brought into its locked position, a squeezing force between the base unit, the lifting column housing and the cross member can be achieved.

In an embodiment the supporting frame comprises a clamp with guides for cooperation with the guide on the base unit. In this embodiment the housing of the lifting column is placed between the base unit and the clamp. When the locking element is placed in the locked position, this will in cooperation with the base unit and the clamp exert a squeezing force on the lifting column housing, which propagates to the cross member. Thus the housing of the lifting column and the cross member is fixed to the base unit. The locking element can in an embodiment be inserted and retained in the locked position in an opening in the clamp.

In an embodiment the cross section of the base unit is in the shape of a hollow profile in which the lifting column housing can be arranged by sliding it in from an open end. Expediently, the hollow profile of the base unit comprises a recess for the telescopically arranged profiles of the lifting column, by which the entire housing of the lifting column can be received in the base unit. For fixation of the lifting column in the base unit the hollow profile of the base unit can comprise an opening in which the locking element is inserted and retained in a locked position.

In an embodiment the housing of the lifting column comprises a guide for cooperation with the guide on the base unit. Thus, the lifting column and the cross member can be fixed to the base unit without using a clamp. For fixation of the lifting column the base unit comprises an opening in which the locking element can be inserted and retained in the locked position.

In an embodiment of the supporting frame the lifting column is of the type, where an electric motor and a transmission for bringing about the movement of the lifting column are arranged in the housing of the lifting column.

In another embodiment the supporting frame is of the type where an electric motor and a transmission for bringing about the movement of the lifting column are arranged in one of the telescopically arranged profiles and where the housing as a separate unit is mounted on a free end of one of the outermost telescopically arranged profiles. The housing thus functions as an adaptor by which it is possible to use this type of lifting column for the supporting frame.

The invention will be explained more fully below under reference to the accompanying drawings. For the sake of the clarity of the drawings it should be noted that the shown elements often are depicted as cut off. A dotted line through the element concerned shows where it has been shortened. In the drawings.

Figure 1:
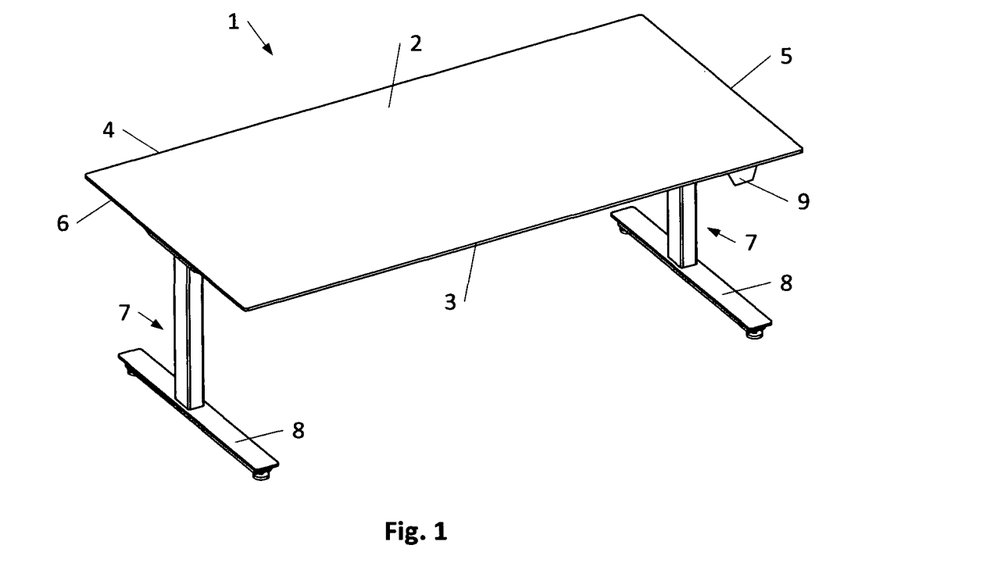
FIG. 1 is a height-adjustable table equipped with lifting columns.

The height-adjustable table 1 shown in FIG. 1 comprises a table top 2 having a front side 3 at which a user is expected to be situated, a rear side 4, a right side 5 and a left side 6. At the right side 5 and left side 6, respectively, of the table top 2 there is a telescopic lifting column 7. The lower end of the lifting columns 7 is mounted with an elongated foot 8, which extends in a direction across the table. The telescopic lifting columns 7 can be adjusted in their longitudinal direction by means of an operating unit 9, by which the height of the table top 2 can be adjusted. The two lifting columns 7 are connected to a control box comprising a controller. Further, the control box is connected to the operating unit 9 from which the height of the table top 2 can be adjusted.

Figure 2:
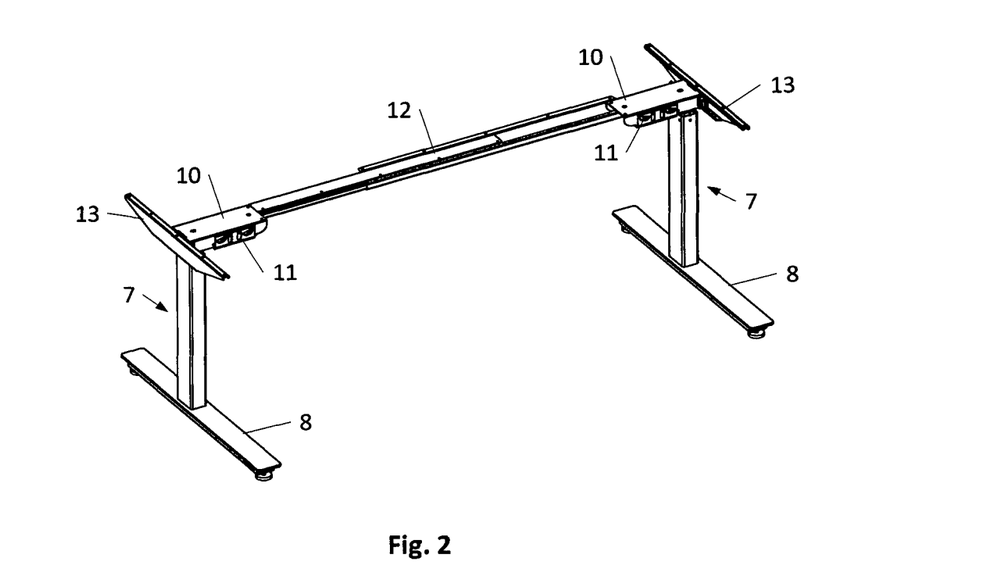
FIG. 2 is a supporting frame for the height-adjustable table shown in FIG. 1.

FIG. 2 shows a first embodiment of a supporting frame for the height-adjustable table shown in FIG. 1. The supporting frame further comprises two base units 10,11 and two clamps 12,13 between which the lifting columns are mounted. The two base units 10,11 are connected to the two telescopically arranged longitudinal members 14,15. Further, each of the base units has a cross member 16,17 secured thereto.

Figure 3:
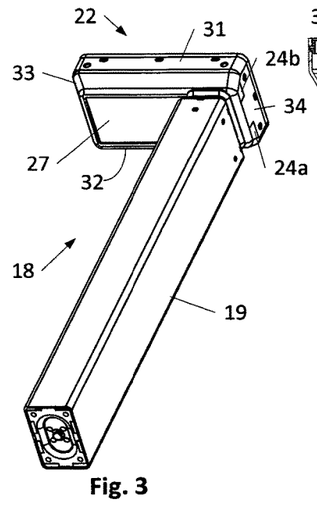
FIG. 3 is a perspective view of a lifting column.
Figure 4:
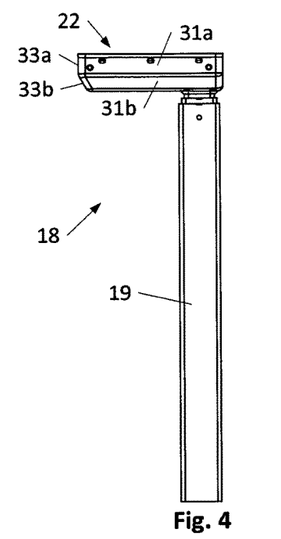
FIG. 4 is a lifting column in a retracted position seen from one side.
Figure 5:
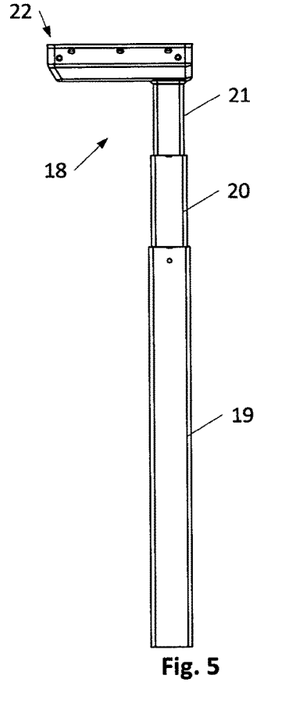
FIG. 5 is a lifting column in a partially extended position seen from one side.
Figure 6:
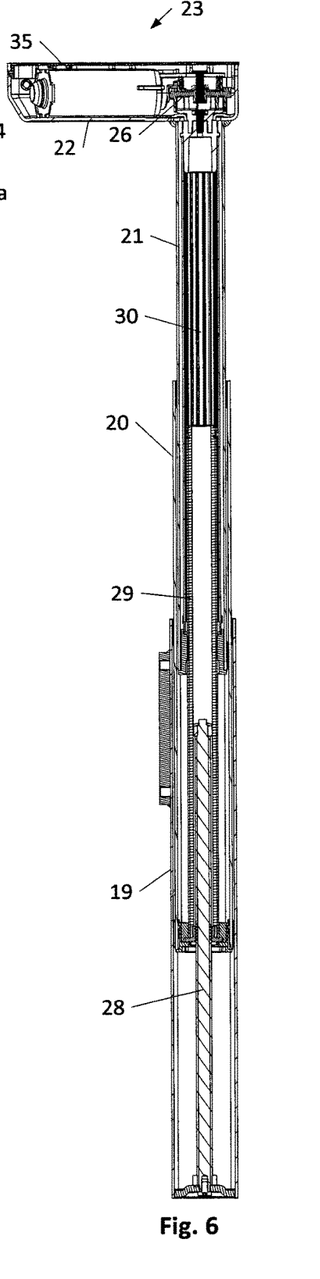
FIG. 6 is a section through the lifting column shown in FIG. 5.

FIGS. 3 and 4 illustrate a lifting column 18 shown in a perspective view and from the side, respectively. FIG. 5 shows the same lifting column 18 in a partially extended position. The lifting column comprises a guide consisting of three telescopically arranged rectangular profiles 19,20,21. Further, the lifting column 18 comprises a box-shaped housing 22. For bringing about the movement of the lifting column 18 this comprises a linear actuator, see FIG. 6. The linear actuator consists of a motor unit 23 arranged in the box-shaped housing 22 (see FIG. 6) and a linear moveable activation element arranged in the hollow of the rectangular profiles 19,20,21. The motor unit 23 comprises a reversible electric motor 25 and a transmission 26. The linear moveable activation element is constructed as a spindle unit connected to the transmission 26 of the motor unit through a hole in the bottom portion 27 of the motor housing. The spindle unit consists of a solid spindle 28, a hollow spindle 29 and a tube 30 with a spindle nut at the top. The housing 22 consists of a rectangular steel box having two parallel side portions 31,32, a front end 33 and a rear end 34, which are parallel, as well as a bottom portion 27. The top of the housing 22 can be closed by means of a cover 35. The external surfaces on the front end 33 and the two side portions 31,32 comprise two surfaces. A first plane surface 31*a*,33*a* (see FIG. 4), which extends from the top of the housing towards the bottom portion 27 of the motor housing and which is parallel to the longitudinal axis of the rectangular profiles 19,20,21, and in continuation thereof a second plane surface 31*b*,33*b*, which describes an acute angle with the longitudinal axis of the rectangular profiles 19,20,21 and forms a connection with the bottom portion 27 of the motor housing. Consequently, the area of the top of the motor housing is larger than the area of the bottom portion 27. The transition from the first plane surface to the second plane surface and further from the second plane surface to the bottom portion 27 is rounded off. The rear end further comprises two indentations 24*a*,24*b*;58*a*,58*b*.

Figures 7, 8:
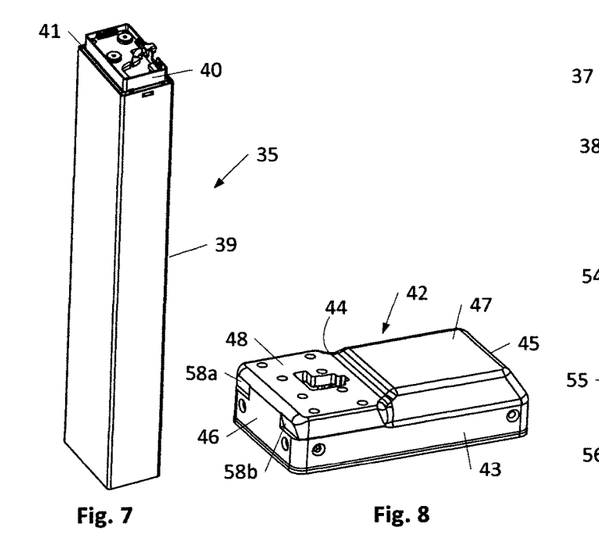
FIG. 7 is a perspective view of a lifting column, where the drive unit is arranged in the telescopically arranged profiles.
FIG. 8 is a housing as a separate unit for the lifting column in FIG. 7.

FIG. 7 shows a perspective view of a different type of lifting column 35 without housing, a so-called in-line lifting column, where the entire drive unit, including electric motor 37 and transmission 38, is arranged in the telescopically arranged profiles 39,40,41. FIG. 8 shows a housing 42 as a separate unit intended for mounting at the topmost end of the lifting column 35, more precisely for mounting in the profile 41. The housing 42 consists of a rectangular steel box with two parallel side portions 43,44, a front end 45 and a rear end 46, which are parallel, as well as a bottom portion 47. The top of the housing 42 can be closed by means of a cover. Further, the housing comprises a mounting surface 48 for mounting of a lifting column 35 of the type shown in FIG.

Figure 9:
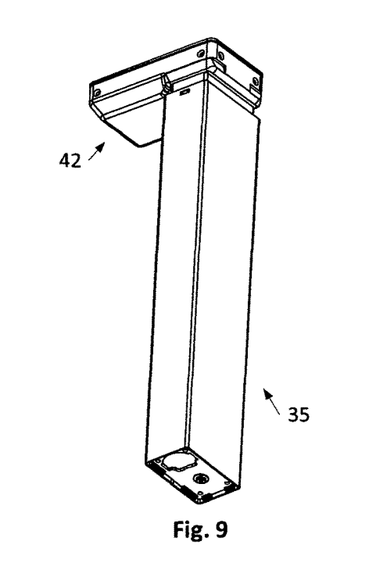
FIG. 9 is the lifting column in FIG. 7 mounted with the housing in FIG. 8.

7. The rear end further comprises two indentations 58*a*,58*b*. FIG. 9 shows a perspective view of the lifting column 35 mounted with the housing 42.

Figure 10:
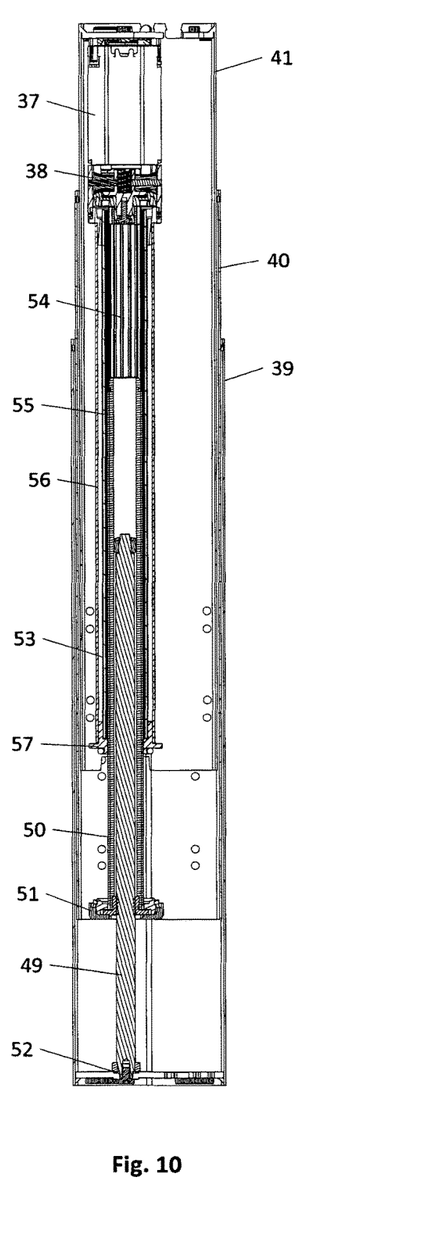
FIG. 10 is a section through the lifting column shown in FIG. 7, FIGS. 11-27 are a series of figures of a first embodiment of the supporting frame.

The drive unit in FIG. 10 is constructed as a linear actuator for bringing about the telescopic movement of the lifting column 35. The linear actuator comprises a spindle unit consisting of a solid spindle 49 and a hollow spindle 50, both with external threads. At the lower end of the hollow spindle a spindle nut 51 for the solid spindle 49 is secured, said spindle nut 51 is constructed as a bushing with internal threads. By rotating the hollow spindle 50 the spindle nut 51 will screw itself up along the solid spindle 49, as this is secured against rotation at its free end 52. The hollow spindle 50 is surrounded by a drive tube 53, which on the internal side is equipped with a number of axially running grooves 54. At the uppermost end of the hollow spindle 50 the external side is fitted with a ring 55 having a number of external fins protruding into the grooves 54 on the drive tube 53. Surrounding the drive tube 53 there is a guide tube 56 at the lower end of which, a spindle nut 57 for the hollow spindle 50 is secured. The spindle nut 57 is in the shape of a bushing with internal threads. When the drive tube 53 is rotated, the guide tube 56 will screw itself up along the hollow spindle 50, as the guide tube 56 at its upper end is secured against rotation. As the hollow spindle 50 is driven around this will screw itself synchronously up along the solid spindle 49 as explained above, i.e. the axial movement is the joint movement of both hollow and solid spindle. The drive tube 53 is driven by an electric motor 37 through a transmission 38. The transmission comprises a worm gear, which through a gear wheel set drives a crown wheel, which then drives the drive tube 53.

Figure 11:
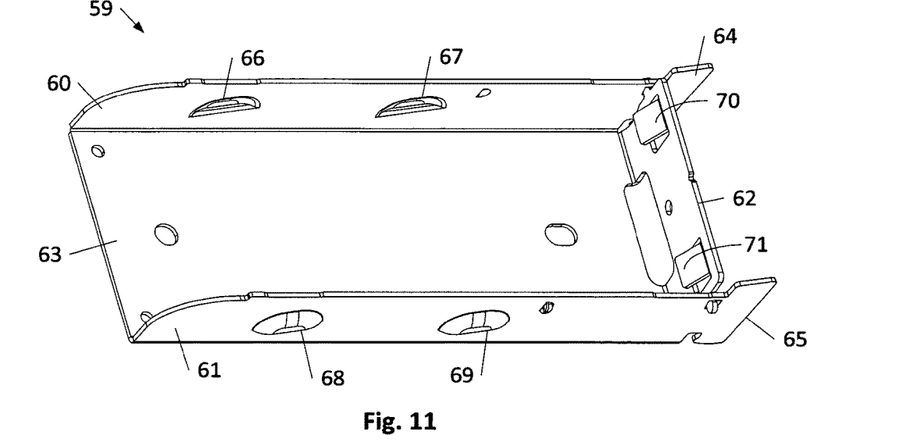
Figure 12:
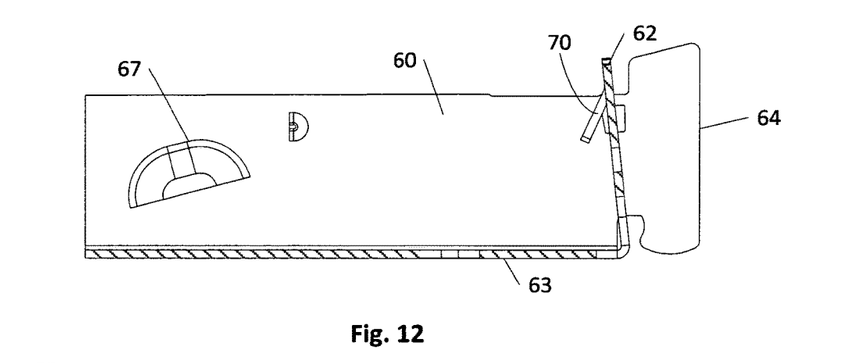

FIG. 11 shows in a second embodiment of the supporting frame, a perspective view of a base unit 59 with two side walls 60,61, a transverse wall 62 between the two side walls 60,61 and a bottom 63. The side walls 60,61 are at the transverse wall 62 extended by two flaps 64,65 with two recesses located opposite each other, such that the flaps appear as double-sided hooks or clasps. Each side wall 60,61 comprises two guides 66,67;68,69 functioning as guiding. The transverse wall 62 of the base unit has two tongues 70,71, which with their free ends face into and extend towards the bottom 63 of the base unit. FIG. 12 shows the base 59 in a longitudinal section parallel to the side walls 60,61.

Figure 13:
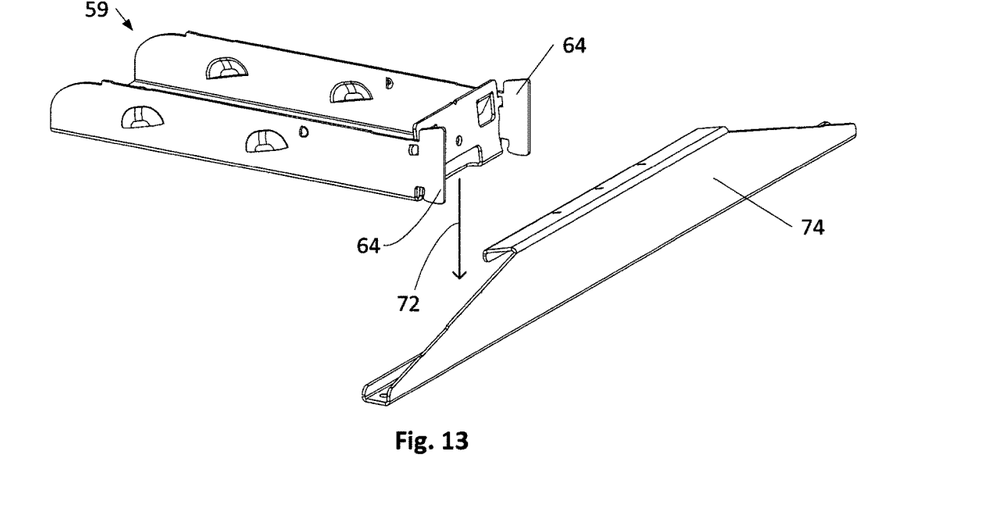
Figure 14:
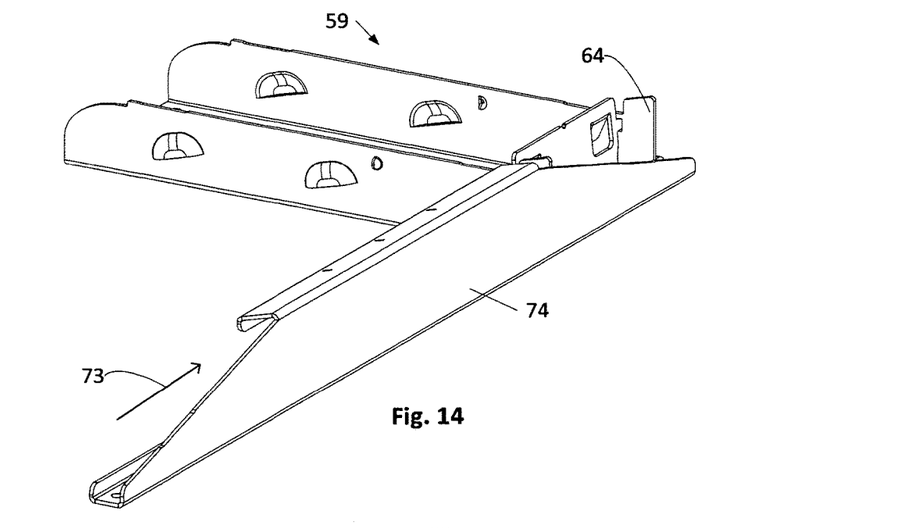
Figure 15:
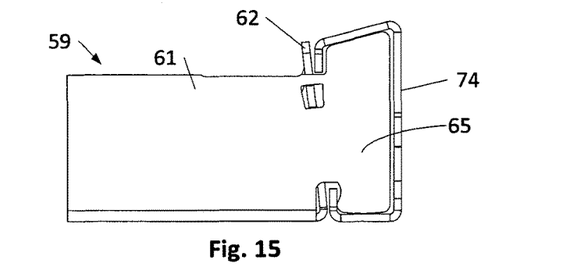
Figure 16:
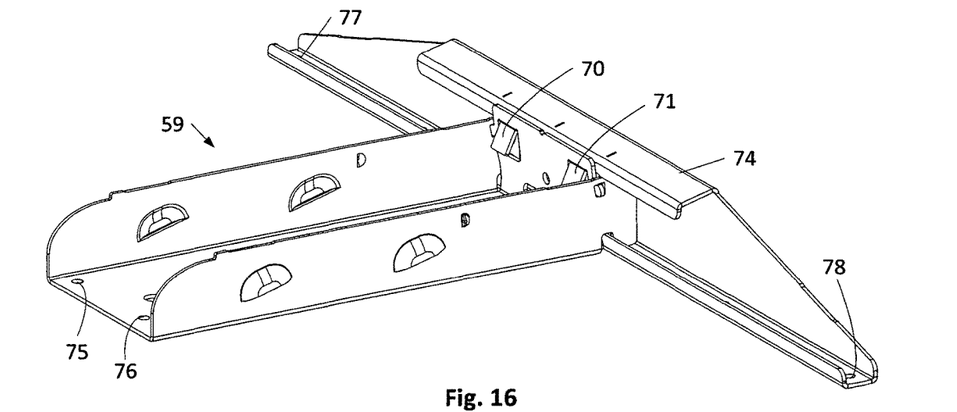
Figure 17:
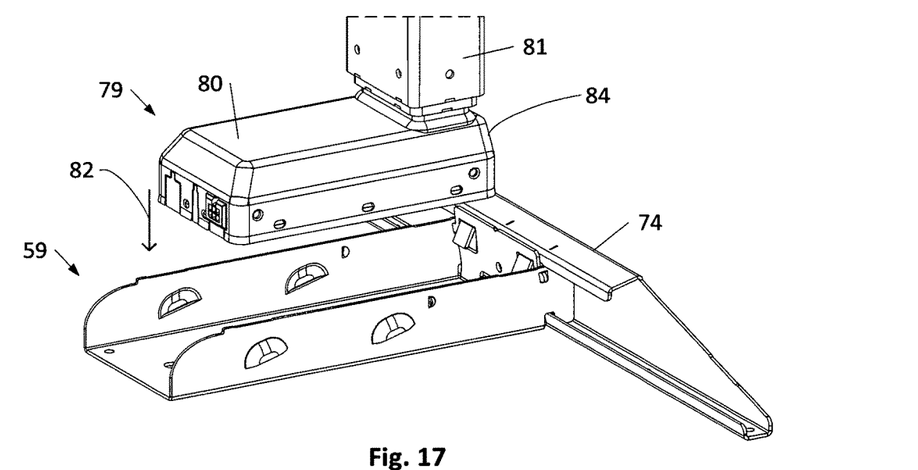
Figure 18:
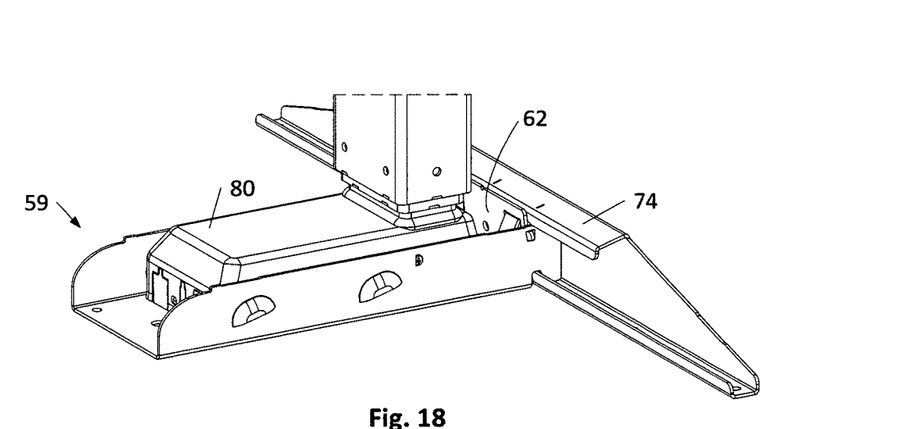
Figure 19:
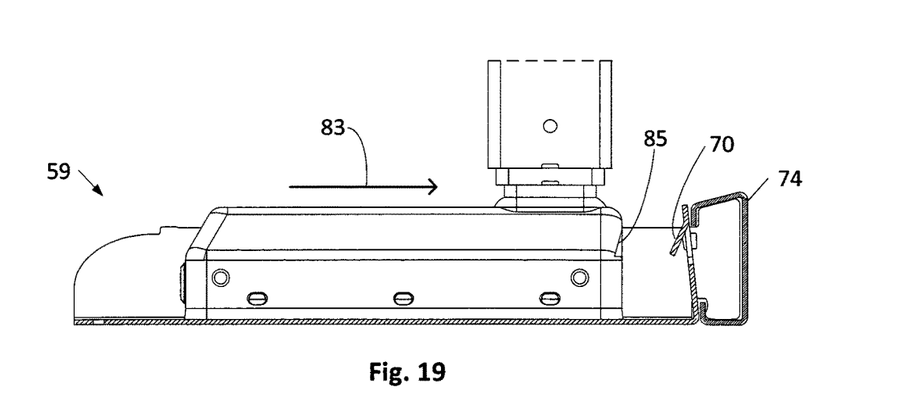
Figure 20:
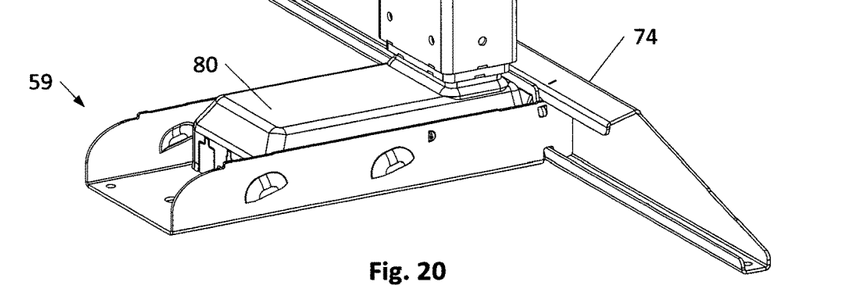

Under reference to FIGS. 13-26 the first embodiment of the supporting frame is described in the following, including how to assemble it. Thus, the arrows 72,73 in FIGS. 13 and 14, respectively, show how the flaps 64,65 of the base unit are guided into the C-shaped profile of the cross member 74. FIG. 15 shows, seen from the side wall 61 of the base unit 59, how the flap 65 is received in the profile of the cross member 74. FIG. 16 shows a perspective view of the placement of the base unit 59 in the cross member 74. It is noted that both the base unit 59 as well as the cross member 54 comprises a number of mounting holes 75,76;77,78 for mounting of a table top to the supporting frame.

FIGS. 17 to 21 show a perspective view and section of how the lifting column 79, and more specifically, how the lifting column housing 80, is placed in the base unit 59. Due to the clarity of the figures the telescopically arranged profiles 81 have been shown cut off. The placement of the lifting column housing 80 in the base unit 59 is indicated by the arrows 82,83, which thus show that the lifting column housing 80 is arranged against the bottom 63 of the base unit and between the side walls 60,61 of the base unit. The lifting column 79 is positioned such that the rear end 84 (corresponding to the rear end 43,54 in FIGS. 3 and 8, respectively) of the lifting column housing 80 engages the transverse wall 62. The rear end 84 has two indentations 85 (only one has been numbered) corresponding to the indentations 24*a*,24*b*;58*a*,58*b* in FIGS. 3 and 8, respectively. As it appears from FIG. 21 the tongue 70 in the transverse wall 62 of the base unit is in engagement with the indentation 85 on the lifting column housing 80.

Figure 21:
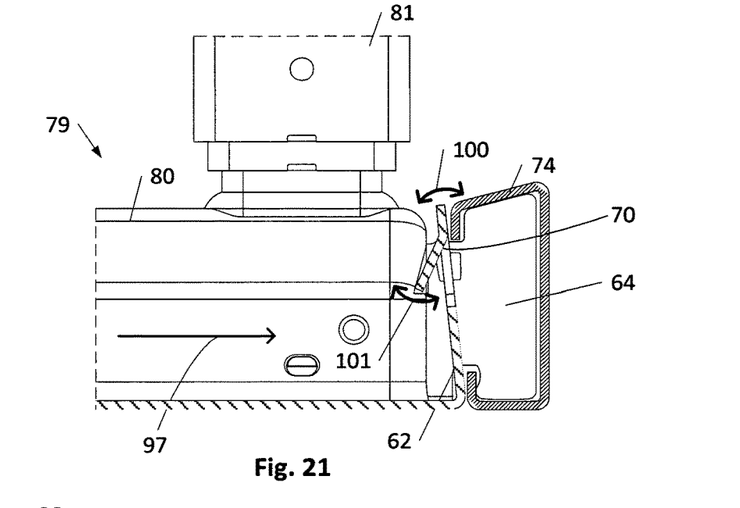
Figure 22:
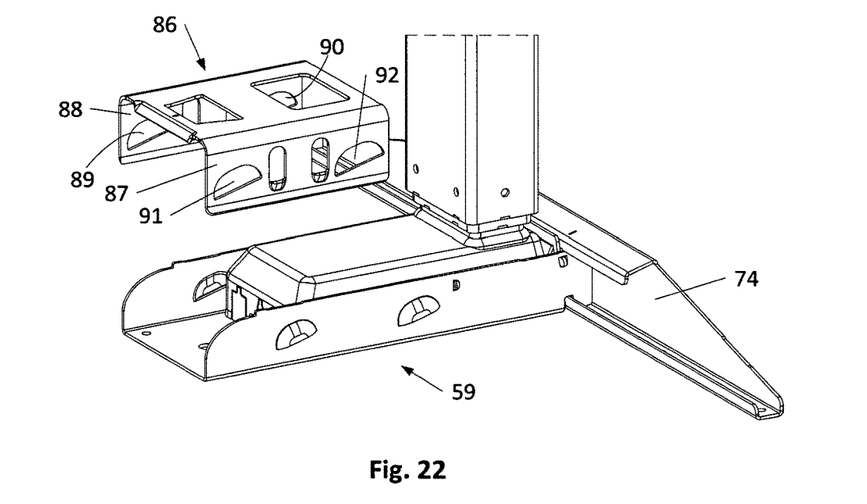
Figure 23:
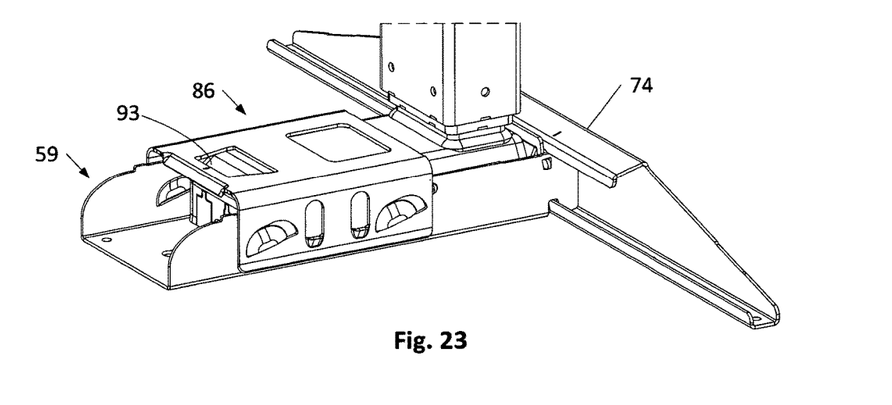
Figure 24:
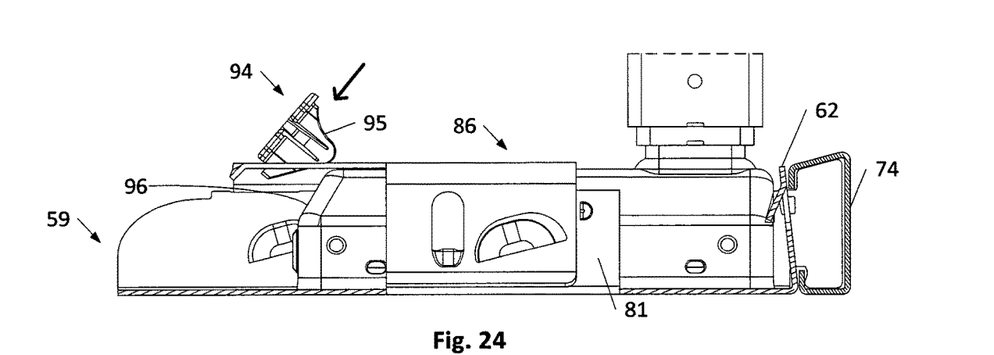
Figure 25:
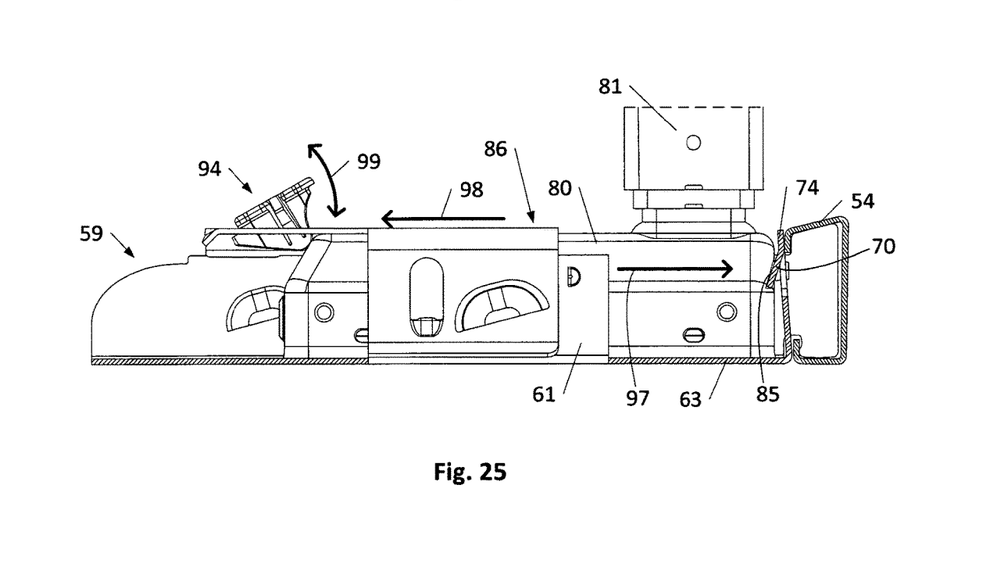
Figure 26:
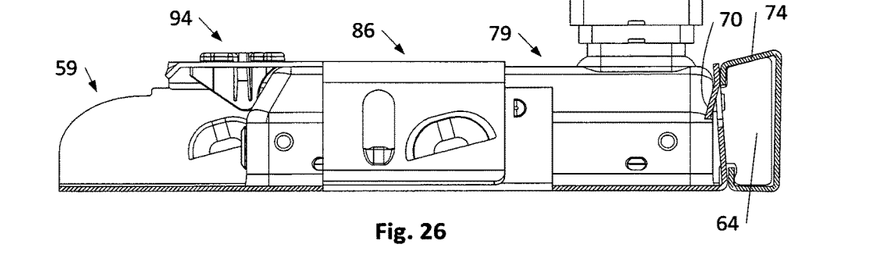
Figure 27:
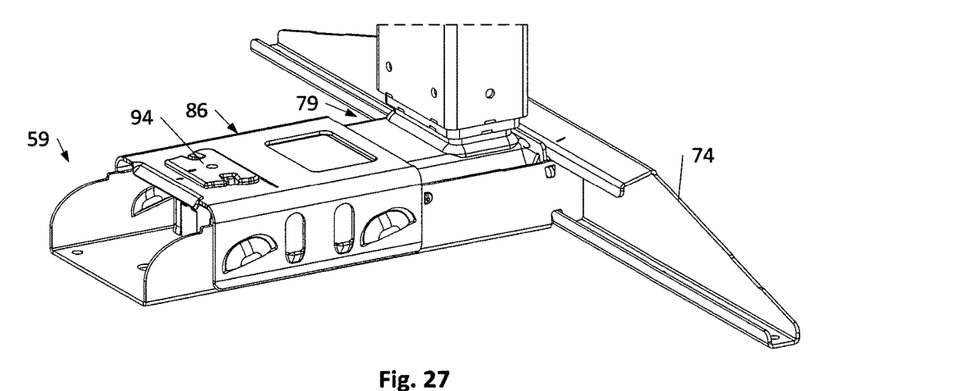

FIGS. 22 and 23 show how the clamp 86 is mounted on the base unit 59. The clamp 86, which has a U-shaped cross section, is furnished with two holes 89,90;91,92 on each side wall 87,88. When the clamp 86 is mounted on the base unit, the holes 89,90;91,92 of the clamp are in engagement with the guide 66,67;68,69 of the base unit, by which the clamp 86 can be guided along the base unit 59. The clamp 86 has an opening 93 in which a locking element in the shape of a locking block 94 can be inserted, see FIG. 24. The locking block 94 can in a rotatable manner be pressed into the opening to a locked position, see FIG. 26. As shown in FIG. 25 the surface 95 of the locking block will during this movement engage the front end 96 of the lifting column housing 80. Through the engagement mentioned above between the holes 89,90;91,92 of the clamp and the guides 66,67;68,69 of the base unit, as well as the engagement of the locking block 94 with the front end 96 of the lifting column housing 80, a displacement between the lifting column housing 80 and the clamp 86 relative to the base unit 59 occurs. As indicated by the arrows 97,98,99 in FIG. 25 the clamp 86 is pushed in a direction away from the transverse wall 62 of the base unit and towards the bottom 63 of the base unit. Further, the lifting column housing 80 is pushed against the transverse wall 62 of the base unit. Through the engagement between the tongue 70 in the transverse wall 62 of the base unit and the indentation 85 in the rear end of the housing, the tongue 70 exerts a downwardly directed force against the bottom of the indentation 85. When the tongue 70 is pushed backwards toward the transverse wall 62 it rotates about its point of attachment and thereby extends further downwards. Thus, the lifting column housing 80 is pushed further down towards the bottom 63 of the base unit, see arrow 100 in FIG. 21. With a point of rotation located in the transition from the bottom 63 of the base unit to the transverse wall 62 of the base unit, the transverse wall is pushed against the cross member 94, see arrow 101 in FIG. 21. Thus, the lifting column 79 and the transverse wall 74 are positioned and fixed to the base unit. FIG. 27 shows how the supporting frame according to the first embodiment appears assembled.

Figure 28:
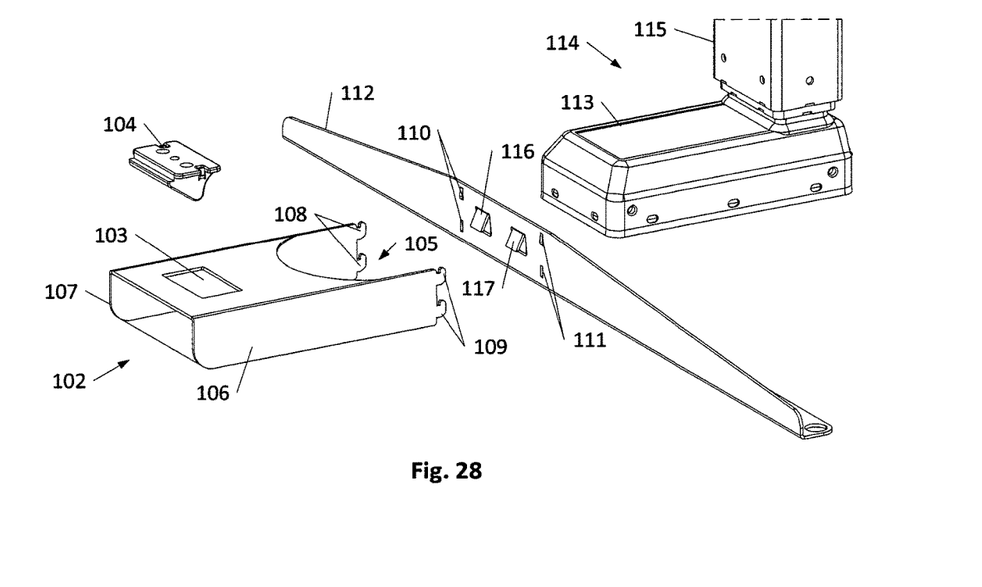
FIG. 28 is an exploded perspective view of a second embodiment of the supporting frame.

FIG. 28 shows an exploded perspective view of a second embodiment of the supporting frame. Here, the base unit 102 is designed with a cross section as a rectangular hollow profile. The base unit 102 comprises an opening 103 adapted for the locking element 104. The base unit 102 further comprises a recess 105, which is open towards one end of the base unit 102. In continuation of the same end of the base unit 102 the side walls 106,107 have a number of hook- or clasp-shaped flaps 108,109 which are prepared for engagement with a corresponding number of holes 110,111 in a cross member 112. For assembly of the supporting frame the housing 113 is placed on the lifting column 114 in the base part 102 in such a manner that the telescopically arranged profiles 115 of the lifting column extend from the recess 105 in the base unit 102. Subsequently, the cross member 112 is secured to the base unit 102 through engagement between the flaps 108,109 and the recesses 110,111. Finally, the locking element 104 is inserted into the opening 103 and pressed into a locked position. Thus, the lifting column housing 113 is pushed against the cross member 112. Through an engagement between the tongues 116,117 on the cross member 112 and indentations on the rear end of the lifting column housing 113 (corresponding to the indentations 24a,24b;58a,58b on FIGS. 3 and 8, respectively), the lifting column housing 113 is pushed down towards the bottom of the hollow profile of the base unit. Thus, the lifting column 114 and the cross member 112 are fixed to the base unit 102 and the supporting frame appears assembled.

Figure 29:
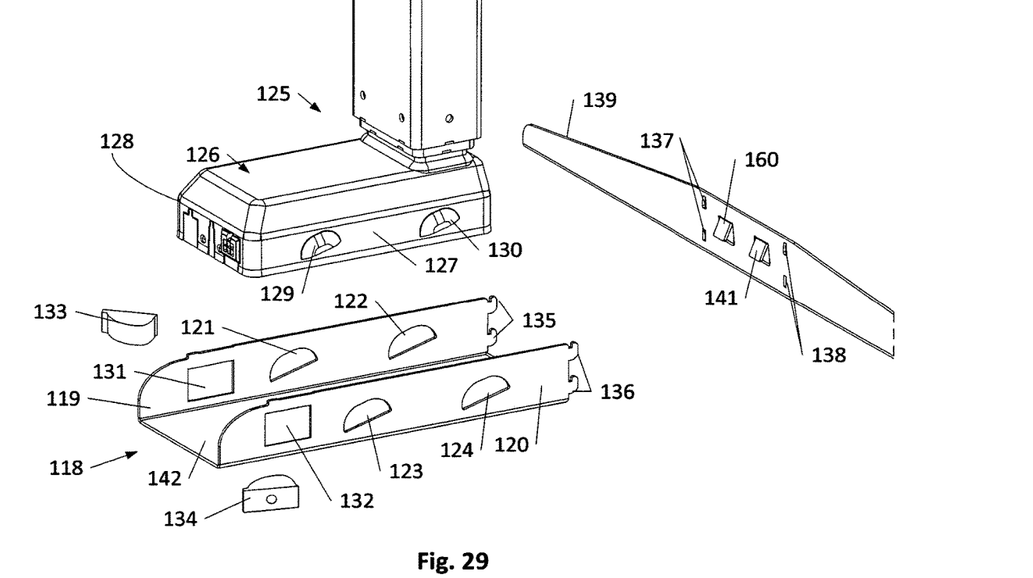
FIG. 29 is an exploded perspective view of a third embodiment of the supporting frame seen from the end of the telescopically arranged profiles of the lifting column towards the lifting column housing.

FIG. 29 shows a third embodiment of the supporting frame in exploded perspective view and seen from the end of the telescopically arranged profiles of the lifting column and towards the lifting column housing, respectively. The base unit 118 has a U-shaped cross section and the side walls 119,120 each comprises two guides 121,122;123,124. On the lifting column 125 the side walls 127,128 of the housing 126 likewise comprises guides 129,130. It is noted that only the guides 129,130 on the side wall 127 are shown. Corresponding guides are located at the opposite side wall 128. The guides 129,130 on the side wall 127 are intended for engagement with the guides 123,124 on the side wall 120 of the base unit 118. Each of the side walls 119,120 comprises an opening 131,132 in which a locking element in the shape of a locking block 133,134 can be inserted and fastened.

In continuation of the side walls 119,120 opposite of the holes 131,132 the base unit 118 comprises hook- or clasp-shaped flaps 135,136 prepared for engagement with the holes 137,138 on the cross member 139 which thus can be mounted to the base unit 118. When the housing 126 of the lifting column subsequently is placed in the base unit 118 the guides 129,130 on the side wall 127 enters into engagement with the cooperating guides 123,124 on the side wall 120 of the base unit 118. The locking blocks 133,134 are subsequently inserted into openings 131,132, and can in a rotatable manner be pressed down into the openings 131,132 to a locked position. Thus, the lifting column housing 126 is pushed against the cross member 139. Through an engagement between the tongues 140,141 in the cross member 139 and the indentations in the rear end of the lifting column housing 126 (corresponding to the indentations 24a,24b; 58a,58b), the lifting column housing 126 is pushed down towards the bottom 142 of the base unit. A similar principle is shown in FIG. 21. Thus, the lifting column 125 and the cross member 139 are fixed to the base unit 118 and the supporting frame thus appears assembled.

Figure 30:
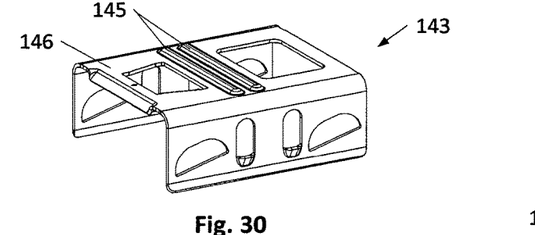
FIGS. 30 and 31 are an alternative embodiment of a clamp and a base unit.
Figure 31:
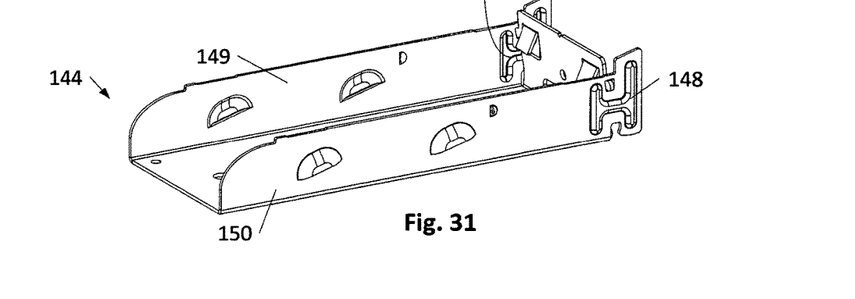

FIGS. 30 and 31 show alternative embodiments of a clamp 143 and a base unit 144, respectively. In order to increase the mechanical strength the clamp 143 is constructed with two reinforcements 145 on the outer side of the bottom 146 of the U-shaped profile of the clamp 143. For the same purpose the base unit 144 is constructed with reinforcements 147, 148 on each of the side walls 149,150 of the base unit 144.

Figure 32:
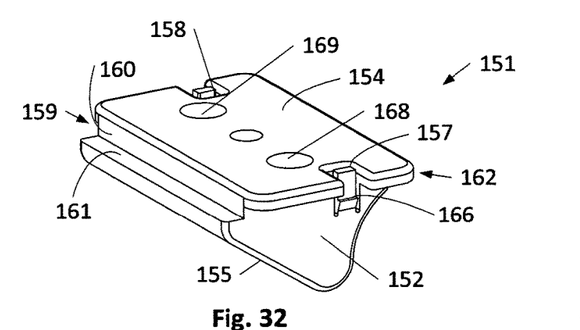
FIGS. 32-34 are a perspective view of an embodiment of the locking block seen from the side.
Figure 33:
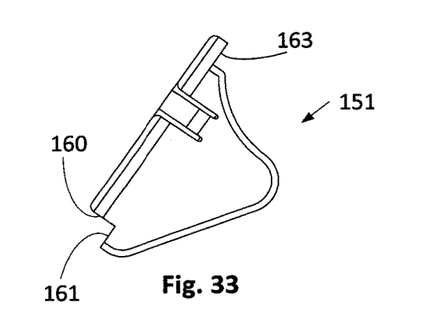
Figure 34:
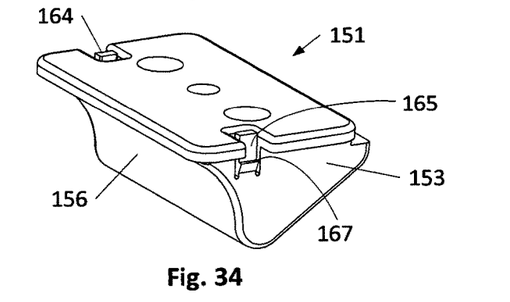

The construction and functions of the locking block, as described above, are described in the following with reference to FIGS. 32-34, where the locking block is referenced 151. The locking block 151 is in all essentials wedge-shaped with two sides 152,153, a top surface 154, a first end surface, a rear surface 155 and a second end surface, front surface 156.

The top surface 154 comprises a recess 157,158 at each of the two sides 152,153. At the transition from the top surface 154 to the rear surface 155 the locking block comprises a projecting edge 159. The projecting edge 159 comprises a vertical surface 160 for engagement with a side surface in the opening in which the locking block is to be fixed. The projecting edge 159 further comprises a horizontal surface 161 for engagement against the underside of the unit (clamp or base unit) in which the locking block 151 is fixed. The top surface 154 extends with a collar 162 over the two sides 152,153 and the front surface 156. The underside 163 of the collar 162 is intended for engagement against the upper side of the unit (clamp or base unit) in which the locking block is fixed.

The transition from the underside 163 of the collar 162 to the two sides 152,153 of the locking block and the front surface 156 is approximately perpendicular to the top surface 154. After the transition the front surface 156 has a concave course, after which it runs convex in the transition to the rear surface 155. From this transition the rear surface 155 has a straight course, which finally is rounded off in the transition to the projecting edge 159.

Each of the two recesses 157,158 in the sides 152,153 is furnished with a snap lock, constructed as flaps 164,165 which in a resting position extend in a direction perpendicular to the top surface 154. The flaps 164,165 are secured to the bottom of the recesses 157,158, which partially enclose the flaps 164,165. The free space between the recesses 164,165 and the flaps 164,165 enables the flaps 164,165 to tilt in a direction perpendicular to the two sides 152,153 of the locking block.

Each of the flaps 164,165 of the snap lock comprises a collar with a projecting edge 166,167, which has a surface parallel to the top surface 154, prepared for engagement against the underside of the unit (clamp or base unit) in which the locking block is fixed.

For bringing the locking block 151 into a locked position the locking block 151 is inserted into an opening in a clamp or a base unit such that the projecting edge 159 is in engagement with a rear edge in the opening. Further, the concave transition from the front surface 156 to the rear surface 155 of the locking block 151 rests on the front end of the lifting column housing. By applying a force on the top surface 154 the locking block 151 is in a rotatable manner pressed into the opening; it rotates around the rear edge in the opening. Further, the lifting column housing is pushed in a direction away from the locking block 151, as the contact between the front surface 156 of the locking block and the front end of the lifting column housing gradually changes from a line of action to a plane of action.

As the underside of the collar 162 abuts the upper side of the unit (clamp or base unit) in which the locking block is fixed, the flaps 164,165 of the snap locks are tilted backwards in a direction towards each other and returns to their resting position when the projecting edges 166,167 engages the underside of the unit (clamp or base unit) in which the locking block is fixed. The locking block 151 is thus wedged in the unit as a result of: the engagement between the horizontal surface 161 of the projecting edge 159 and the underside of the unit, the engagement in the plane of action between the front surface 156 of the locking block and the front end of the lifting column housing, and the engagement between the projecting edges 166,167 and the underside of the unit. Thus, the locking block 151 is in its locked position.

The locking block 164 can be brought out of its locked position by tilting the flaps 164,165 of the snap lock backwards in a direction against each other and bring the front surface 156 of the locking block out of engagement with the front end of the lifting column housing. The latter is expediently done by inserting a screw driver or the like into one of the holes 168,169 in the top surface 154.

It is understood that the elements or principles of each of the three embodiments can be combined in consideration of the specific application of the supporting frame. The invention is here particularly mentioned in connection with height-adjustable tables, but it is under understood that the invention can also be used in connection with other types of furniture. It is further noted that even though the invention initially is intended for mounting of electrically driven lifting columns it is obvious that the invention can also be used for mounting of manually adjustable lifting columns as long as there is a housing at the upper end thereof.

The invention claimed is:

1. A supporting frame comprising:
   an electrically driven lifting column with telescopically arranged profiles, wherein the telescopically arranged profiles have an upper and lower end, to which upper end a lifting column housing is secured,
   a base unit comprising a compartment at least for partial reception of the lifting column housing,
   a cross member for mounting on the base unit, and
   a locking element, which when placed in a locked position exerts a squeezing force between the base unit, the lifting column housing and the cross member, by which the lifting column housing and the cross member are fixed in the base unit, and wherein the locking element comprises means for retaining the locking element in the locked position.

2. The supporting frame according to claim 1, wherein the cross member has a C-shaped cross section for engagement with the base unit.

3. The supporting frame according to claim 2, wherein the base unit comprises flaps for engagement with the cross member.

4. The supporting frame according to claim 3, wherein the flaps are in continuation with the compartment of the base unit.

5. The supporting frame according to claim 1, wherein the base unit has a U-shaped cross section with two parallel side walls having a mutual distance between them which corresponds to the width of the lifting column housing.

6. The supporting frame according to claim 5, wherein the base unit comprises a transverse wall between the side walls of the base unit.

7. The supporting frame according to claim 6, wherein the transverse wall comprises a tongue, which with an end protrudes into the compartment in the base unit for at least partial reception of the lifting column housing.

8. The supporting frame according to claim 7, wherein the lifting column housing comprises an indentation for engagement with the tongue in the transverse wall or the cross member.

9. The supporting frame according to claim 1, wherein the cross member comprises a tongue, which when the cross member is mounted on the base unit, with a free end protrudes into the compartment of the base unit at least for partial reception of the lifting column housing.

10. A height-adjustable table comprising the supporting frame according to claim 1.

11. A supporting frame comprising:
    a lifting column with telescopically arranged profiles, wherein the telescopically arranged profiles have an upper and lower end, to which upper end a lifting column housing is secured,
    a base unit comprising a compartment at least for partial reception of the lifting column housing,
    a cross member for mounting on the base unit, and
    a locking element, which when placed in a locked position exerts a squeezing force between the base unit, the lifting column housing and the cross member, by which the lifting column housing and the cross member are fixed in the base unit, and wherein the locking element comprises means for retaining the locking element in the locked position,
    wherein the base unit has a U-shaped cross section with two parallel side walls having a mutual distance between them which corresponds to the width of the lifting column housing.

12. The supporting frame according to claim 11, wherein the base unit comprises a transverse wall between the side walls of the base unit.

13. The supporting frame according to claim 12, wherein the transverse wall comprises a tongue, which with an end protrudes into the compartment in the base unit for at least partial reception of the lifting column housing.

14. The supporting frame according to claim 13, wherein the lifting column housing comprises an indentation for engagement with the tongue in the transverse wall or the cross member.

15. A supporting frame comprising:
    a lifting column with telescopically arranged profiles, wherein the telescopically arranged profiles have an upper and lower end, to which upper end a lifting column housing is secured,
    a base unit comprising a compartment at least for partial reception of the lifting column housing,
    a cross member for mounting on the base unit, and
    a locking element, which when placed in a locked position exerts a squeezing force between the base unit, the lifting column housing and the cross member, by which the lifting column housing and the cross member are fixed in the base unit, and wherein the locking element comprises means for retaining the locking element in the locked position,
    wherein the cross member comprises a tongue, which when the cross member is mounted on the base unit, with a free end protrudes into the compartment of the base unit at least for partial reception of the lifting column housing.

* * * * *